United States Patent
Bloembergen et al.

(10) Patent No.: US 9,080,290 B2
(45) Date of Patent: Jul. 14, 2015

(54) USE OF BIOBASED SUGAR MONOMERS IN VINYL COPOLYMERS AS LATEX BINDERS AND COMPOSITIONS BASED THEREON

(75) Inventors: Steven Bloembergen, Okemos, MI (US); Ian J. McLennan, Lansing, MI (US); Do Ik Lee, Midland, MI (US)

(73) Assignee: ECOSYNTHETIX LTD., Lansing, MI (US)

( * ) Notice: Subject to any disclaimer, the term of this patent is extended or adjusted under 35 U.S.C. 154(b) by 0 days.

(21) Appl. No.: 13/877,410

(22) PCT Filed: Oct. 7, 2011

(86) PCT No.: PCT/CA2011/001125
§ 371 (c)(1),
(2), (4) Date: Jun. 5, 2013

(87) PCT Pub. No.: WO2012/045159
PCT Pub. Date: Apr. 12, 2012

(65) Prior Publication Data
US 2013/0281608 A1    Oct. 24, 2013

Related U.S. Application Data

(60) Provisional application No. 61/391,367, filed on Oct. 8, 2010.

(51) Int. Cl.
*D21H 19/58* (2006.01)
*C08F 251/00* (2006.01)
*C08F 290/10* (2006.01)
*D21H 19/20* (2006.01)
*D21H 19/56* (2006.01)

(52) U.S. Cl.
CPC .............. *D21H 19/58* (2013.01); *C08F 251/00* (2013.01); *C08F 290/10* (2013.01); *D21H 19/20* (2013.01); *D21H 19/56* (2013.01)

(58) Field of Classification Search
CPC .... D21H 19/58; D21H 19/192; C08F 251/00; C08F 290/10
USPC .................. 524/548; 526/238.2, 238.23, 72
See application file for complete search history.

(56) References Cited

U.S. PATENT DOCUMENTS

| | | | |
|---|---|---|---|
| 4,134,872 A | 1/1979 | Lee et al. | |
| 4,478,974 A | 10/1984 | Lee et al. | |
| 5,872,199 A * | 2/1999 | Bloembergen et al. | .... 526/238.2 |
| 6,242,593 B1 | 6/2001 | Bloembergen et al. | |
| 6,355,734 B1 | 3/2002 | Cassar et al. | |

OTHER PUBLICATIONS

Bloembergen, S., et al., "Second-Generation Repulpable PSAs for Benign USPS Postage STamps", Adhesive & Sealants Industry, May 2002, pp. 42-48.
Rawlins, J.W., et al., "Synthesis of Alkyd/Acrylic Hydrid Latexes for paper coating applications", TAPPI J., pp. 11-23, Jun. 2009.
Bloembergen, S., et al., "Specialty biobased monomers and emulsion polymers derived from starch", TAPPI 11th Advanced Coating Fundamentals Symposium, Oct. 11-13, 2010, Munich, Germany, pp. 1-19.

* cited by examiner

*Primary Examiner* — Michael M Bernshteyn
(74) *Attorney, Agent, or Firm* — Scott Pundsack; Borden Ladner Gervais LLP (57) ABSTRACT

The present invention provides the novel and nonobvious discovery that sugar macromers can be effectively used to provide a new generation of renewable comonomers for biosynthetic hybrid paper binder systems having a controlled hydrophilic-hydrophobic balance for improved water retention and film forming properties, on machine runnability, offset printability, biodegradability, enhanced recyclability, and other performance attributes.

17 Claims, 5 Drawing Sheets

Where $R_1$ = unsaturated ester or H;
$R_2$ = alkyl or other functional group

USE OF BIOBASED SUGAR MONOMERS IN VINYL COPOLYMERS AS LATEX BINDERS AND COMPOSITIONS BASED THEREON

RELATED APPLICATIONS

This application is a national phase entry of PCT/CA2011/001125, filed on Oct. 7, 2011, which claims the benefit under 35 USC 119 of U.S. Provisional Patent Application No. 61/391,367, filed on Oct. 8, 2010, which is incorporated by reference. The present invention is directed to uses of biopolymer compositions such as those described in U.S. Pat. No. 5,872,199 to Bloembergen et al., U.S. Pat. No. 6,242,593 to Bloembergen et al., and U.S. Pat. No. 6,355,734 to Cassar et al., all of which are hereby incorporated by reference herein for all purposes.

STATEMENT REGARDING FEDERALLY SPONSORED RESEARCH OR DEVELOPMENT

Not Applicable.

BACKGROUND OF THE INVENTION

Polymeric adhesives and paper coatings are used in many paper, paperboard and disposable packaging applications. Numerous adhesives, paper coating binders and glossy coatings or varnishes are used in coated paper, paperboard, the packaging of products such as salt, sugar, tea, coffee and bottle labels, etc. All of these products, and numerous other packaging materials end up for the most part in recycled paper, board and packaging or in municipal solid waste (MSW) streams in landfills. Paper and paperboard represent a significant component (about 35% by volume) of the MSW stream and efforts are underway to recycle certain streams and compost others. These largely cellulosic packaging materials should ideally be designed to be fully compatible with composting or paper recycling operations.

With the rising cost of virgin fiber and the increased demand for wastepaper, the pressure is on to re-use more and more contaminated wastepaper. As a result, contaminant removal, which is essential to convert wastepaper into a reusable fiber, is one of the most important factors influencing the economics of the recycling operation, since this has a direct bearing on the yield of reusable fiber from wastepaper and its total cost. Old newsprint (ONP) is the most abundant used paper fiber source, and is most commonly used for the production of recycled paper. Efficient removal of the ink from ONP can be generally accomplished only by incorporating about 25 to 40% of old magazine (OMG). The OMG contains clays and mineral particles that facilitate the removal of the ink by a flotation de-inking process. The introduction of OMG also improves fiber strength and brightness levels of the recycled fiber. On the other hand, the incorporation of OMG in the recycling process introduces polymer residues from the adhesives and coatings used to manufacture the magazines.

To benefit the environment, adhesives, paper coating binders, varnishes and other polymeric resins used in paper and paperboard applications should be repulpable and not interfere with the recycling process. In addition, they should be biodegradable and have the required cost and performance characteristics to compete effectively in the market place.

Various natural adhesives (starches, dextrins, etc.) and derivatives of natural products which are biodegradable and have adhesive properties, such as carboxymethyl cellulose, amylose from starch, and casein from milk find uses in adhesive applications. Natural adhesives are used in packaging applications, but they continue to be displaced by synthetics primarily due to performance. The same is true for co-binders used in paper coatings, including thermally modified, acid thinned, phosphorylated and ethylated starches. Although they are biodegradable and compostable, these natural adhesives and paper coating binders can cause a problem in paper recycling because they are water soluble, and thus are concentrated in the closed-system water loop of the repulping process where they can build up in the initial section of the dryer and on the dryer felts. This problem is even more severe for synthetic (petroleum based) latex products used in paper since these soft polymers typically elongate and extrude through the basket screens of paper recycling operations [see Bloembergen, S., Nemeth, S. B., and McLennan, I. J., "Second-Generation Repulpable PSAs for Benign USPS Postage Stamps", Adhesives & Sealants Industry, p. 42-48, (May 2002).]. And this is a problem not only for adhesives, but also for paper coating binders, overprint varnishes, thickeners, rheology modifiers and other synthetic latex additives.

With the growing trend of mills re-using their process water, It is becoming as important to effectively remove all contaminants from the pulp flow as it is to remove them totally from the water system in an effort to prevent the accumulation of colloidal impurities. The preferred approach to achieve this requirement is to separate the contaminants at the earliest possible step in the process, but the inherent sticky nature of currently used synthetic (petroleum based) hot melts, pressure-sensitive adhesive products, and latex binders and emulsions used in paper makes this very difficult. The reduction of water consumption (zero-discharge) with closed water recirculation systems causes reagglomeration of dispersed adhesives and latex binders, resulting in white pitch problems and deposits known as "stickies" on dryer walls and on the polyester 'wire', i.e. the felt on which the recycled paper is deposited. This occurs at very high speeds, and once stickies begin to deposit, build-up occurs exponentially leading to costly mill shut downs.

The residues from adhesives, coating binders and other polymeric materials currently used in glossy paper coatings, sizing agents, toner particles, etc., which lead to the formation of "stickies", can have a major impact on the smooth operation and the economics of a paper recycling process. Currently, centrifugal cleaning and fine screening are regarded as the best systems for stickies removal, but these are costly and inefficient.

U.S. Pat. No. 5,872,199 to Bloembergen et al., U.S. Pat. No. 6,242,593 to Bloembergen et al., and U.S. Pat. No. 6,355,734 to Cassar et al., are all directed to repulpable & biodegradable adhesives and ink resins. In addition to adhesives and ink resins, there is a need for the design of repulpable & biodegradable paper coating binders.

Paper coatings are pigment-containing coatings compositions that are applied onto paper and paperboard to improve their aesthetic appearance and printability. The pigment coatings impart smoothness, gloss, brightness, and opacity to the base sheets for improved appearance, and provide them with enhanced printability which requires resistance to ink film-splitting forces, fountain-solution receptivity, balanced ink setting and holdout, ink gloss, sharp halftone reproduction, etc. For the pigment coatings, pigments and pigment binders are the most important ingredients so that their selections are critical. Pigment binders not only perform the basic required role of binding pigment particles to each other and bonding them to the base sheets, but also significantly influence the rheology, coater runnability, and drying behaviors of pigment coating formulations and the optical, viscoelastic, and printing properties of coated paper and paperboard products. Various types of soft latexes, such as styrene-butadiene (S/B), styrene-butyl acrylate (S/BA), and polyvinyl acetate (PVAc) latexes, are widely used as binders for paper coatings. These three major types of paper coating latexes are often functionalized with monomers containing carboxylic acids (—COOH), amides (—CONH$_2$), hydroxyl groups (—OH), etc. and modified with monomers such as acrylonitrile (VCN), methyl methacrylate (MMA), etc. [see D. I. Lee, "Coating Binders-Latex," Chapter 19 in "*Pigment Coating and Surface Sizing of Paper*" edited by Esa Lehtinen for "*The Papermaking Science and Technology Book Series*," The Finnish Paper Engineers' Association and TAPPI PRESS, 2000]. S/B latexes are latexes of modified copolymers of styrene (hard monomer) and butadiene (soft monomer) at varying ratios ranging from 40/60 to 80/20. Their glass transition temperatures (Tg's) range from −25 to 50° C. S/A latexes are latexes of modified styrene (hard monomer) and n-butyl acrylate (soft monomer) at varying ratios ranging from 40/60 to 60/40. Their Tg's range from −10 to 40° C. PVAc latexes are mostly homopolymer latexes. Polyvinyl acetate homopolymer Tg's are about 30° C., but their wet latex Tg's (9-11) are about 13° C. so that they are room temperature film-forming latexes despite their high polymer Tg's.

In each type of paper coating latexes, many variations in composition, functional modification, molecular structure, particle size, etc. can be found. For example, there are commercial S/B and S/A latexes having low, medium, and high levels of carboxylation for unique paper coating properties such as high binding strength, high mechanical stability, etc. In order to incorporate polar moieties into and increase the surface energetics of S/B and S/A latex copolymers, they are often copolymerized with either acrylonitrile (VCN) or acrylic acid (AA) or methacrylic acid (MA), along with various other functional monomers. Many carboxylated S/B/MMA/VCN latexes are widely used as paper coating binders in Japan. Among these three types of paper coating latexes, S/B and S/A latexes are very similar in performance except that they have their respective unique properties, but they are quite different from PVAc latexes. [see D. I. Lee, "Coating Binders-Latex," Chapter 19 in "*Pigment Coating and Surface Sizing of Paper*" edited by Esa Lehtinen for "*The Papermaking Science and Technology Book Series*," The Finnish Paper Engineers' Association and TAPPI PRESS, 2000]. As mentioned, most of PVAc latexes are homopolymer latexes, but they are also available as vinyl acrylic latexes which are vinyl acetate copolymers with ethyl acrylate or n-butyl acrylate and as vinyl acetate ethylene copolymer latexes. They are sometimes lightly carboxylated. Polyvinyl acetate homopolymer and copolymer latexes are not only highly polar and hydrophilic, but also tend to hydrolyze and produce polyvinyl alcohols, especially on the particle surface, and become more hydrophilic. For these reasons, they are highly water-swollen and their particle surfaces are modified with polyvinyl alcohols. These unique properties impart higher viscosity to paper coating formulations and higher porosity to coated papers than their counterpart SIB and S/A latexes. On the other hand, because of the high low-shear viscosity and high-shear dilatant behavior of paper coating formulations, they are limited to lower coating solids than their counterparts.

In addition to their different chemistries, the molecular architecture of S/B, S/A, and PVAc latex polymers is also different [see U.S. Pat. No. 4,478,974. Oct. 23, 1984 to D. I. Lee et al., and U.S. Pat. No. 4,134,872. Jan. 16, 1979 to D. I. Lee]. S/B latex copolymers are crosslinked because of butadiene having two double bonds, whereas S/A and PVAc latex polymers are linear, unless intentionally crosslinked. Because S/B latex copolymers are crosslinked, they can only be characterized in terms of % gel and swell index, along with some information on the molecular weights of their soluble portions. For this reason, S/B latexes for paper coating applications should not be called either S/B rubber latexes or S/B latex rubbers which contain high butadiene (>65%) and are nearly non-crosslinked. Although S/A and PVAc latex polymers are mostly soluble in appropriate solvents and can be characterized by their molecular weights, they are sometimes insoluble because they are intentionally crosslinked. In this case, their gels will be isolated and characterized in terms of swelling index, while their solubles can be analyzed for the molecular weights. These differences in the molecular architecture along with their different chemistries result in differences observed in their paper coating performance among three major types of synthetic paper coating latexes.

S/B latexes are more widely used for paper coatings as binders throughout the world than the other two types of paper coating latexes, S/A and PVAc latexes, but S/A latexes are used more in Europe than in North America and Asia, while PVAc latexes are used more in North America.

The dominant commercially available paper coating binders which are petroleum based latex emulsions still cause stickies problems in closed loop recycling mills. Therefore, there is still a need for repulpable latex binders and coatings that match the performance and cost of the predominantly synthetic products now being used. A truly 'repulpable' polymer is a polymer which does not persist as "stickies" in a paper recycling process, but which can be quantitatively removed from the process using conventional equipment found in a paper recycling mill.

In addition, products that are made from ingredients derived from annually renewable crop sources, offer the intrinsic value proposition of a reduced carbon footprint by way of renewable carbon in the product that is in harmony with the rates and time scales of the natural biological carbon cycle.

The present inventors have prepared multiple disclosures regarding the composition and use of various forms of sugar based latex copolymers. For instance, U.S. Pat. No. 5,872,199 describes novel copolymers which are useful in biodegradable, repulpable adhesives, coatings, sizing agents, toners, retention aids and related products used in paper and paperboard applications, in wood gluing and other packaging applications. The copolymers of the '199 patent are represented by the formula wherein Glu is a saccharide moiety which is derived from α,-D-glucose (dextrose), fructose, mannose, galactose, talose, gulose, allose, altrose, idose, arabinose, xylose, lyxose, ribose, or mixtures thereof, or which can be derived by hydrolysis from the group consisting of starch, corn syrups- or maltodextrins, maltose, sucrose, lactose, maltotriose, xylobiose, mellibiose, cellobiose, raffinose, stachiose, levoglucosan, and 1,6-anhydroglucofuranose. $R_1$ and $R_2$ are substituent groups of a vinyl monomer or mixture of vinyl monomers, wherein said vinyl monomer or mixture of vinyl monomers is selected from the group consisting of vinyl acetate, ethyl hexyl acrylate, butyl acrylate, ethyl acrylate, hydroxyethyl acrylate, hydroxyethyl methacrylate, lauryl acrylate, methyl methacrylate, methacryclic acid, acrylic acid, and other acrylates or mixtures of different acrylate monomers, ethylene, 1,3-butadiene, styrene, vinyl chloride, vinylpyrrolidinone, and other vinyl monomers, or mixtures thereof, R is selected from the group consisting of a C1 to C30 alkyl or a mixture thereof, more preferably a C3 to C8 alkyl or a mixture thereof, R''' is selected from the group consisting of a C1 to C30 alkyl or a mixture thereof, or a hydrogen, preferably a C8 to C18 alkyl or a mixture thereof, and most preferably a C12 to C14 alkyl or a mixture thereof; n is an integer ranging from 0 to 10, its average value ranging from 0.3 to 1; thus, $<n+1>=1.3$ to 2 corresponds to the average degree of oligomerization of the alkyl polyglycoside; x and y are integers ranging from 0 to 3 or from 0 to 4, where the maximum value of 3 or 4 for x and y equals the number of hydroxyls on the Glu moiety, but not both x and y are zero, and, p and q are integers ranging from 0 to 1000, but not both p and q are zero. The swirly lines indicate continuing polymer chains.

The invention in U.S. Pat. No. 6,242,593 relates to environmentally friendly sugar-based vinyl monomers useful in repulpable adhesives and other applications. However, this invention does not anticipate, consider nor provide any motivation to utilize the sugar macromers for sugar-acrylic latexes as particularly useful paper coating binders, as in the current invention, nor does it anticipate the advantages that result therefrom. Similarly, U.S. Pat. No. 6,355,734 relates to resin-fortified sugar-based vinyl emulsion copolymers and methods of preparing the same for use as inks. This invention also does not anticipate, consider nor provide any motivation to utilize the sugar macromers for sugar-acrylic latexes as particularly useful paper coating binders, as in the current invention, nor does it anticipate the advantages that result therefrom.

Accordingly, a need exists for methods of treating said sugar macromers to provide sugar-acrylic latexes particularly useful as paper coating binders which accommodate this challenge.

SUMMARY OF THE INVENTION

Here, the inventors demonstrate a novel and non-obvious method of using the sugar macromer compositions such as those described in U.S. Pat. No. 5,872,199 as paper coating binders.

In one embodiment, the sugar macromer technology represents a family of maleated alkyl polyglycosides produced from a biobased sugar such as dextrose from corn and a medium- to long-chain alcohol, wherein vinyl substituents facilitate copolymerization with conventional vinyl comonomers. The sugar macromers are Generally Recognized As Safe (GRAS) and contain no Volatile Organic Compounds (VOCs). The sugar macromers are copolymerized via a free radical copolymerization process (such as starve-fed emulsion polymerization) with vinyl comonomers to form various types of soft latexes, such as sugar-styrene-butadiene (Su/S/B), sugar-styrene-butyl acrylate (Su/S/BA), and sugar-polyvinyl acetate (Su/VAc) latexes. Their dry glass transition temperatures (Tg's) range from –10 to 50° C., while their Tg's in the wet state range from –40 to 45° C. The incorporated sugar macromer polar moieties increase the surface energetics of Su/S/B and Su/S/A latex copolymers, are therefore do not require to be copolymerized with either acrylonitrile (VCN) or acrylic acid (AA) or methacrylic acid (MA), along with various other functional monomers.

In another embodiment, up to 25% by weight or more of sugar macromer is copolymerized via a starve-fed emulsion copolymerization process with vinyl monomers to produce a sugar-based latex binder for coated paper and paperboard products. Given a significant amount of sugar macromer can be incorporated into sugar-based latexes, this technology provides a path to a new generation of bio-synthetic hybrid paper binder systems.

In another embodiment, the particular advantages of the bio-synthetic hybrid paper binder system arise when it is incorporated into a paper coating recipe. In the wet state (i.e. during the high speed coating process), the sugar moieties incorporated via the sugar macromer into the sugar-based copolymer latex binder act as effective plasticizing segments (i.e., via a hydroplasticizing effect), giving improved film forming and water retention to the paper coating as it is applied at high machine speeds, which is deemed particularly beneficial in paper coating machine runnability (and typically this performance attribute is lacking in all-synthetic latex binders), while in turn the sugar moieties result in higher Tg stiff segments in the dry state (which is deemed a particularly beneficial property for coated paper products).

In another embodiment, the particular advantages of the bio-synthetic hybrid paper binder system arise when it is incorporated into a paper coating recipe resulting from a controlled hydrophilic-hydrophobic balance for improved offset printability.

In another embodiment, the particular advantages of the bio-synthetic hybrid paper binder system arise when it is incorporated into a paper coating recipe resulting in enhanced recyclability, biodegradability and renewable content.

In another embodiment, the alkyl moieties attached to sugar macromers which can range from C4 to C30 can be designed to act as permanent in-situ plasticizers.

In another embodiment, the sugar macromers serve as a renewable replacement for acrylonitrile and other relatively toxic functional vinyl comonomers used in common petroleum derived paper coating binders.

Other objects, features and advantages of the present invention will become apparent after review of the specification, claims and drawings.

DETAILED DESCRIPTION OF THE INVENTION

The present invention provides a novel and non-obvious method of preparing the sugar macromer compositions such as those described in U.S. Pat. No. 5,872,199 as a new generation of bio-synthetic hybrid paper binder systems for coated paper and paperboard products. The sugar macromer technology represents a family of maleated alkyl polyglycosides produced from a biobased sugar (dextrose from corn) and a medium- to long-chain alcohol, wherein vinyl substituents facilitate copolymerization with conventional vinyl comonomers. The sugar macromers are GRAS and contain no VOCs. Given a significant amount (up to 25% or more) of sugar macromer can be incorporated into conventional synthetic latexes, this invention provides a path to a new generation of bio-synthetic hybrid paper binder systems that have particularly useful paper coating performance and coated paper properties without having to resort to the relatively more toxic acrylonitrile (VCN) or various other functional monomers.

I. IN GENERAL

Before the present materials and methods are described, it is understood that this invention is not limited to the particular methodology, protocols, materials, and reagents described, as these may vary. It is also to be understood that the terminology used herein is for the purpose of describing particular embodiments only, and is not intended to limit the scope of the present invention which will be limited only by any later-filed nonprovisional applications.

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", and "having" can be used interchangeably.

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described. All publications and patents specifically mentioned herein are incorporated by reference for all purposes including describing and disclosing the chemicals, instruments, statistical analysis and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

II. THE INVENTION

The present invention provides a novel and non-obvious method of using sugar based macromer compositions such as those described in U.S. Pat. No. 5,872,199, (the '199 patent) which is hereby incorporated by reference herein. For purposes of clarity, the "biobased macromers", known as EcoMER®, described throughout represent the macromer of Formula I recited in the claims of the '199 patent. For convenience, the trademark Symbol® is not used in every instance of EcoMER®. However, we intend that EcoMER® be used as an adjective to describe sugar based macromers and the novel uses thereof in the present invention. Notwithstanding the foregoing, the methods and uses described herein are not meant to limit the types of sugar based macromer compositions that can be used in the methods of the current invention.

The present invention utilizes biobased macromers wherein the monosaccharide glucose (dextrose) derived from corn starch provides a means of incorporating biodegradable macromonomers in novel methods of use, including sugar copolymer latexes that provide a new generation of bio-synthetic hybrid paper binder systems that have particularly useful paper coating performance and coated paper properties. These sugar macromers impart new performance attributes by incorporating into the main copolymer backbone structure for the production of novel hybrid vinyl copolymers, making them unexpectedly useful as binders in coating formulations for the manufacture of coated fine paper, light weight coated (LWC) paper and coated paperboard. In some embodiments the copolymers include, without limitation, vinyl acetate, acrylic, styrene butadiene (SIB) and styrene acrylate (S/A) sugar copolymer latexes.

Few renewable monomers or macromers exist. One example that has been explored for paper coating applications includes the synthesis of alkyd/acrylic hybrid latexes using vegetable oil macromonomers, in an effort to provide for lower VOCs, renewable content and new performance attributes [see. Rawlins, James W., Ferguson, Richard C., Stockett, Adam S., Dutta, Sandipan, and Delatte, David E., "Synthesis of Alkyd/Acrylic Hybrid Latexes for Paper Coating Applications", *TAPPI J.*, pp. 18-23, June, 2009].[1]

To answer this long felt, unmet need, the sugar macromer platform of the present invention provides a family of renewable biobased macromonomers suitable for copolymerization with conventional vinyl monomers for use as, for instance, environmentally friendly paper coating binders. The incorporated sugar macromer polar moieties increase the surface energetics of resultant latex copolymers, are therefore do not require to be copolymerized with the relatively more toxic acrylonitrile (VCN) or various other functional monomers.

In one embodiment, the biobased macromers comprise glucose converted to alkyl polyglycoside (APG), wherein the alkyl group (referred to as the "hydrophobe") was designed to impart solubility in vinyl monomers, as well as chemical and thermal stability of the sugar as it converts glucose (a reducing sugar) to a more stable non-reducing sugar moiety. The sugar macromer therefore provides a means of incorporating renewable monomers that are GRAS (generally recognized as safe) and contain no VOCs (volatile organic compounds), making the macromers especially useful in such applications as environmentally friendly paper coating binders.

In one embodiment, maleic anhydride (MAn) is used as the source of double bonds. MAn is highly reactive towards the glucose hydroxyls, and the resulting vinyl ester substituents readily copolymerize with other vinyl monomers. Given the macromer does not homopolymerize with itself, this has provided a safe manufacturing process that is free from the potential of run-away polymerization conditions. The sugar macromer is a resinous solid in 100% active form that flows at temperatures of 45-55° C., and it can be dissolved in other vinyl comonomers such as butyl acrylate or methyl methacrylate to provide a low-viscosity fluid with a Brookfield viscosity substantially below 1000 cps (Pa·s). Sugar macromers in 100% active form are GRAS (generally recognized as safe) and contains no volatile organic compounds (VOCs).

Figure 2:
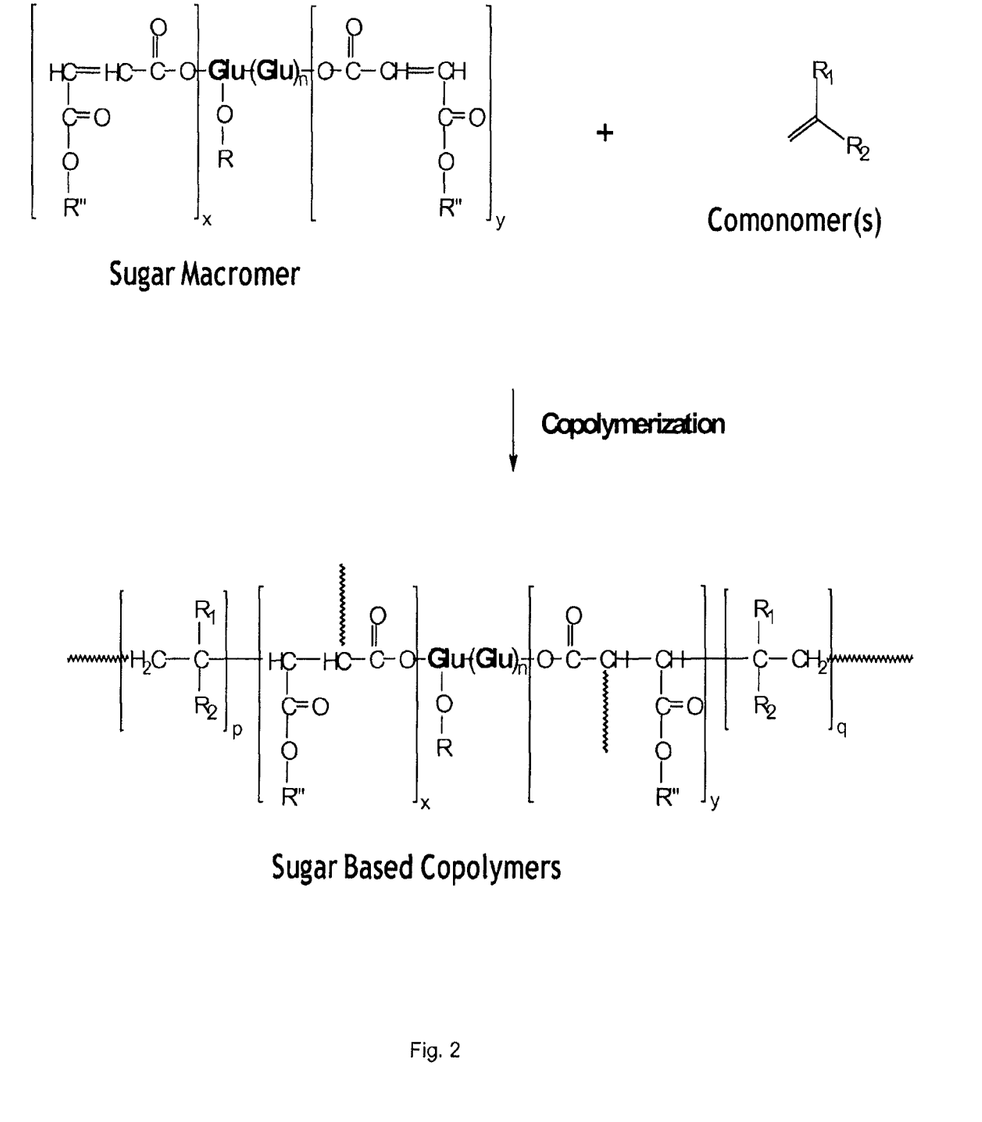
FIG. 2. Schematic illustrating the chemical structure of the sugar macromer and resultant sugar-vinyl copolymers, wherein the corn based sugar is built into the main polymer network structure.

The sugar macromers are copolymerized with vinyl comonomers in an aqueous starve-fed emulsion copolymerization process to produce close to random copolymers that contain the biobased sugar moiety within the backbone of the copolymer network (FIG. 2).

Applications of this technology include pressure sensitive adhesive (PSA) labels, thermosets for wood and plastics, biocomposites for structural materials, circuit boards, ink resins, bioplastics and biopolyesters. Given the greening of the paper industry, the use of these sugar macromers as renewable functional comonomers for replacement of more toxic comonomers such as acrylonitrile is an important step in the development of novel hybrid Su/VAc, Su/S/B and Su/S/A latex binders.

III. EXAMPLES

The following examples are, of course, offered for illustrative purposes only, and are not intended to limit the scope of the present invention in any way. Indeed, various modifications of the invention in addition to those shown and described herein will become apparent to those skilled in the art from the foregoing description and the following examples and fall within the scope of the appended claims.

Sugar Macromers.

The macromers of the present invention are prepared according to Examples 1-9 of the '199 patent. Specifically, free-radical emulsion or suspension copolymerizations were conducted with vinyl monomers and APG maleic acid ester monomers. The emulsion polymerizations were carried out in 1 liter, 4 necked, round bottom reaction kettles equipped with overhead mechanical stirrer, a condenser, a monomer pre-emulsion feed inlet, a thermocouple, an initiator solution feed, a nitrogen purge feed, and a nitrogen bubbler. The reaction vessel was charged with distilled water, stirred at 200 rpm, heated by using a water bath controlled at 80±1° C., and purged with nitrogen. Sodium carbonate buffer and ammonium persulfate initiator were dissolved in water and charged to the reactor immediately before the monomer addition was started. Examples of typical polymerization recipes are known to the art.

Biobased Macromers for Paper Coating Binders.

Pressurized polymerization kettles are employed when butadiene is used as a comonomer. The sugar macromers are copolymerized via a free radical copolymerization process (such as starve-fed emulsion polymerization) with vinyl comonomers to form various types of soft latexes, such as sugar-styrene-butadiene (Su/S/B), sugar-styrene-butyl acrylate (Su/S/BA), and sugar-polyvinyl acetate (Su/VAc) latexes. Based on comonomer composition, their dry glass transition temperatures (Tg's) are designed to range from −10 to 50° C., while their Tg's in the wet state range from −40 to 45° C. due to the hydroplasticizing effect of the sugar moieties. The incorporated sugar macromer polar moieties increase the surface energetics of Su/VAc, Su/S/B and Su/S/A latex copolymers, are therefore do not require to be copolymerized with either acrylonitrile (VCN) or acrylic acid (AA) or methacrylic acid (MA), along with various other functional monomers. Depending on the coated paper or paperboard product and application, the alkyl moieties attached to sugar macromers are selected to range from C4 to C30 to act as permanent in-situ plasticizers and for a controlled hydrophilic-hydrophobic balance for improved offset printability. Up to 25% by weight or more of sugar macromer is copolymerized via a starve-fed emulsion copolymerization process with vinyl monomers to produce a sugar-based latex binder for coated paper and paperboard products.

Fast Atom Bombardment Mass Spectrometry.

Figure 5:
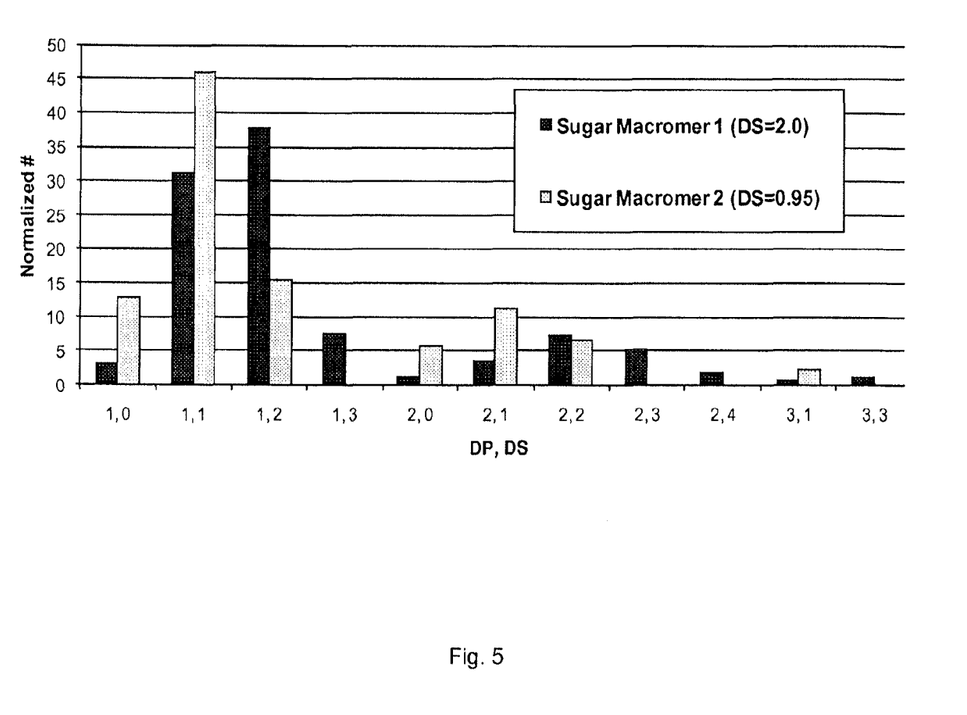
FIG. 5. FAB MAS Spec analysis of two different sugar macromers illustrating their composition in terms of DS and DP as key features of the macromer technology; numeric values on the x-axis indicate no. of glucose (DP) and maleic ester moieties (DS) for each species, resp. The normalized y-axis is the relative MS response in terms of mole %, totaling 100% for all species.

Fast Atom Bombardment Mass Spectrometry (FAB Mass Spec) experiments on different samples of sugar macromer and its APG intermediate were conducted at the Department of Biochemistry at Michigan State University. A JEOL HX 110 double focusing mass spectrometer (JEOL USA) was used, operating in the positive ion mode. The accelerating voltage was 10 KV and the bombarding gas used was xenon. The carrier matrix used was either glycerol or nitrobenzyl alcohol. There was virtually no difference in the mass spectra obtained using either method. FAB Mass Spec demonstrates that the sugar macromer consists of a mixture of different maleated alkyl polyglycosides, containing the monomer and oligomers of glucose with up to three polymerizable vinyl substituents per macromer molecule (FIG. 5).

The biobased sugar macromers consist of alkyl polyglycosides (APGs) in which the glucose —OH functionalities have been reacted with maleic anhydride. The maleate functionalities provide the polymerizable vinyl double bonds such that the sugar macromer can be copolymerized with other vinyl monomers. APGs are formed by reaction of an alcohol via an aldol condensation onto the glucose C1 hydroxyl which muto-rotates via an aldehyde intermediate, and at the same time reacts with other glucose hydroxyls to undergo controlled oligomerization. This controlled oligomerization is key to some of the unique copolymer properties of the biobased macromer.

Figure 1:
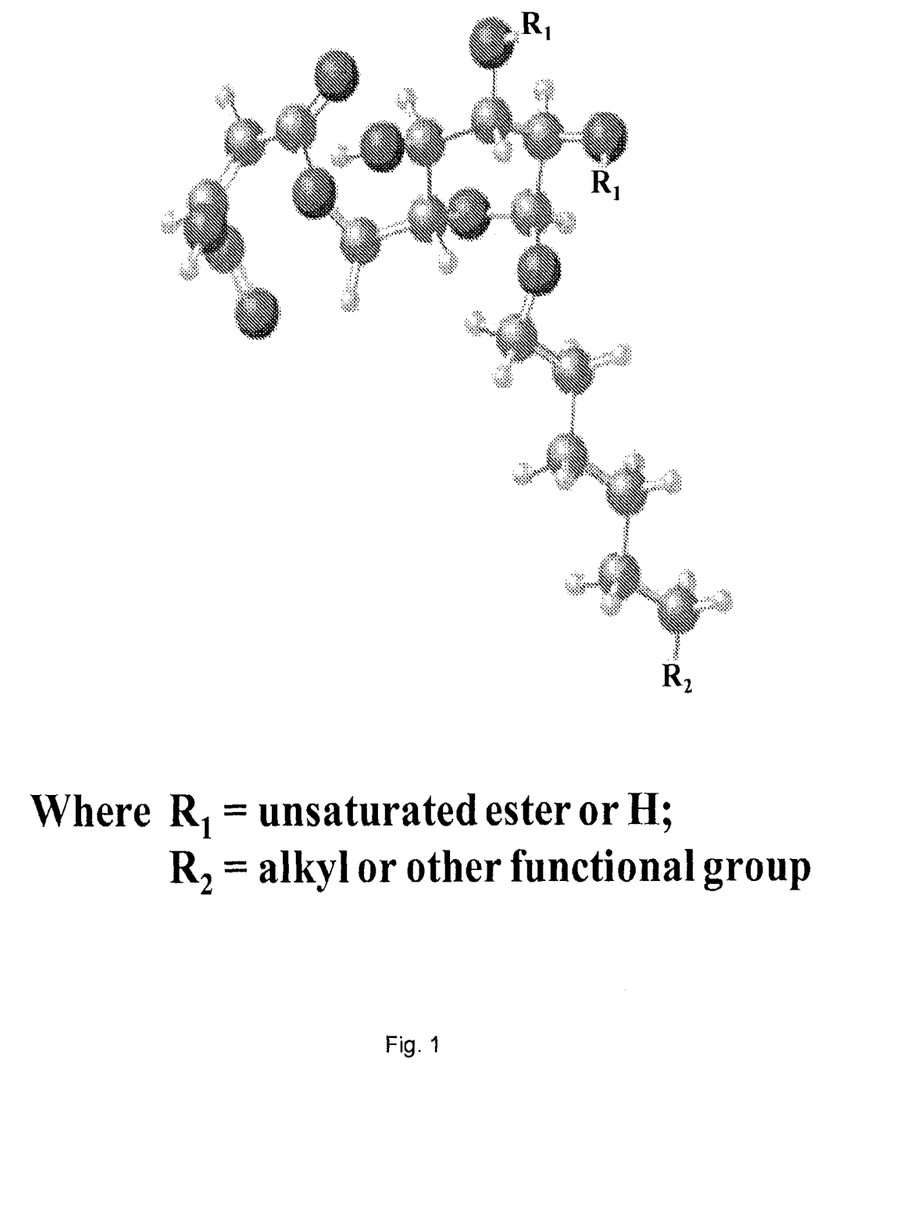
FIG. 1. Simplified ball & stick schematic illustrating some of the essential features of the chemical structure of the bio-based macromer technology.
Figure 3:
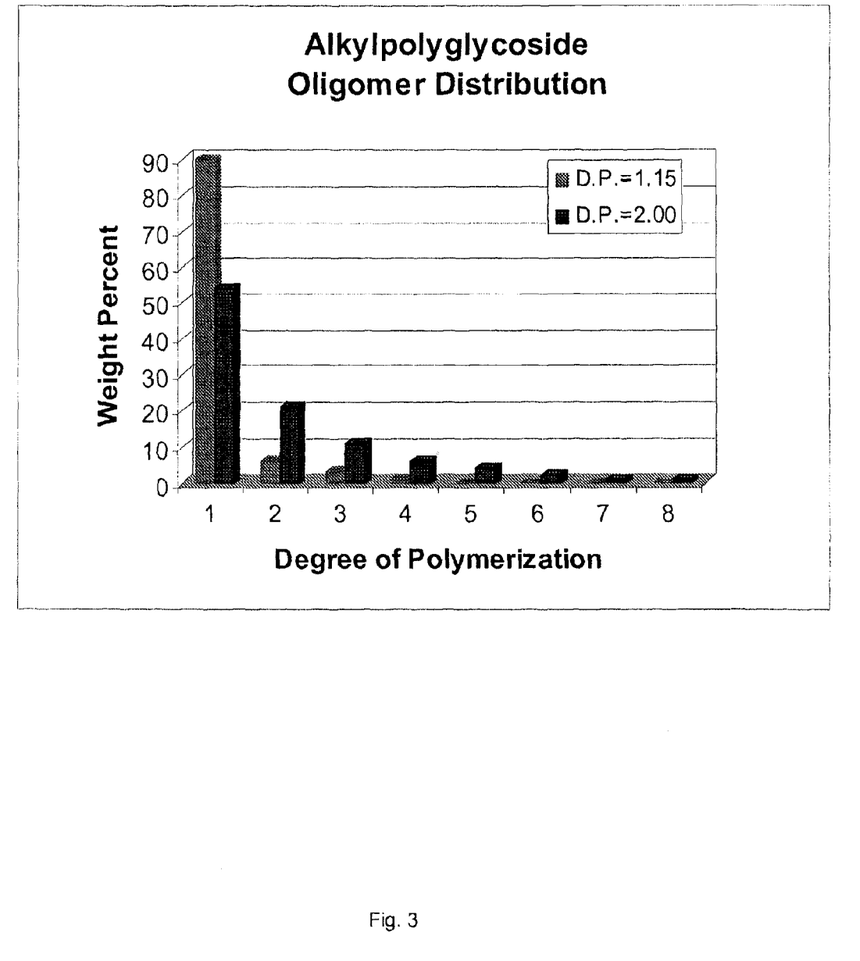
FIG. 3. Theoretical oligomer distribution for an alkyl polyglycoside (APG) with a degree of oligomerization (DP) of 1.15 and 2.00.

APGs consist of distributions of oligomeric glucose with a hydrophobe (i.e. $R_2$ in FIG. 1, or R in FIG. 2) at the C1 terminus. FIG. 3 illustrates the theoretical distribution of oligomers that exist in an APG with an average degree of oligomerization (DP) of 1.15 and 2.0, respectively. The hydrophobe serves to impart organic (comonomer) solubility to the sugar macromer. This is because rather than residing in the aqueous phase, this hydrophobe ensures macromer molecules can move into the polymerizing particles where they are incorporated into the copolymer. The hydrophobe can be modified to achieve the desired hydrophilic-lipophilic balance (HLB).

Figure 4:
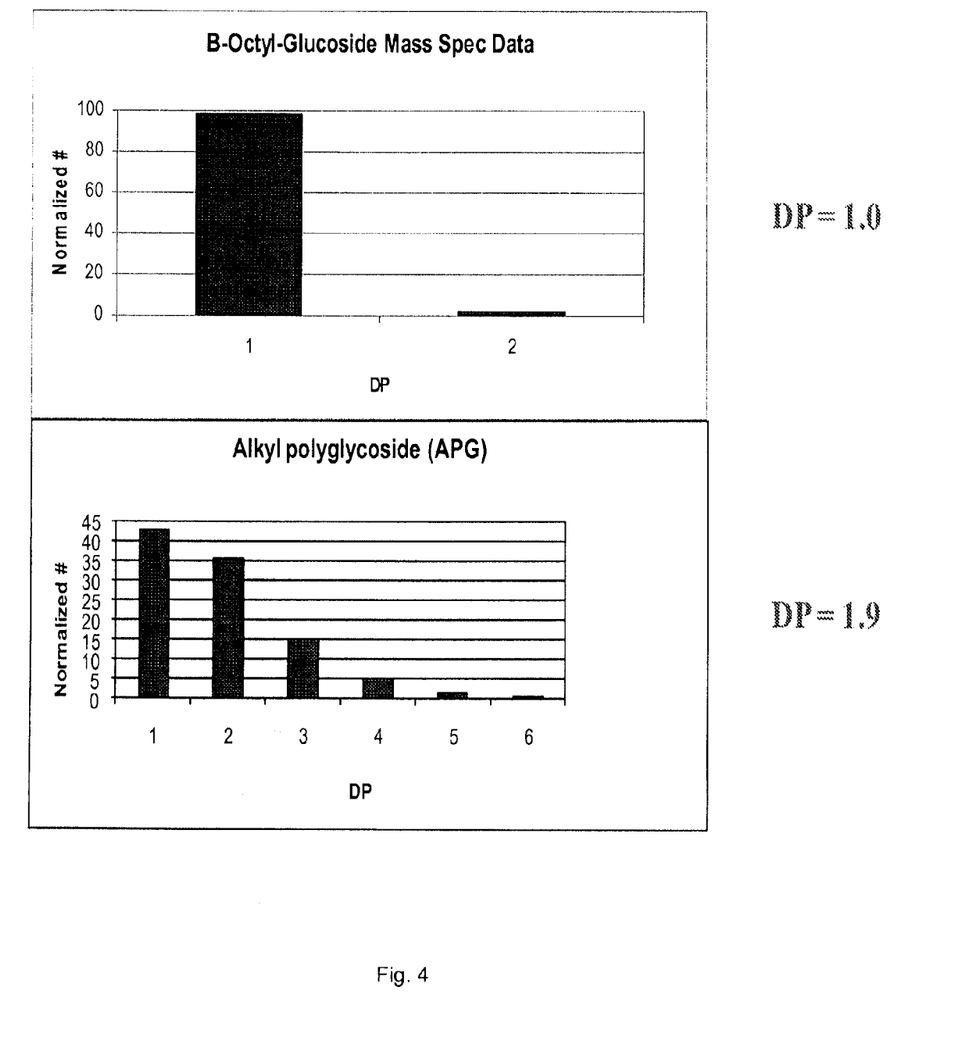
FIG. 4. FAB MAS Spec analysis of β-octyl glucoside (top) with a DP close to 1.0 and an APG (bottom) with a DP=1.9.

While FIG. 3 shows the theoretical oligomer distribution for APG with two different degrees of oligomerization (DP), FIG. 4 illustrates the experimental results obtained by Fast Atom Bombardment Mass Spectrometry (FAB Mass Spec) analysis for an APG and a model compound. The top of FIG. 4 provides the FAB MAS Spec results for β-octyl glucoside, which provides a model compound of a monomeric (DP=1.0) sugar glycoside. This was compared with an oligomeric sugar derivative (bottom of FIG. 4) that serves as one of a number of possible APG intermediates for the sugar macromers, i.e. an APG with a DP=1.9. The FAB MAS Spec results obtained for these two materials demonstrate the ability of this analysis technique to measure oligomer distribution for APGs (FIG. 5).

In addition to oligomerization, the sugar macromer contains the added structural complexity of vinyl substituent functionalities from the reaction of APG with maleic anhydride. The number of vinyl substituents per glucose moiety is referred to as the degree of substitution (DS). Thus, in order to characterize a specific sugar macromer grade, both the DP and the DS are important.

FIG. 5 illustrates the DP & DS distribution for two different sugar macromers as analyzed by FAB Mass Spec. The picture that emerges is that the sugar macromer is essentially a mixture of different maleated APGs, with [1,1] meaning [1 glucose and 1 vinyl substituent], [1,2] meaning [1 glucose and 2 vinyl substituents], [2,2] meaning [2 glucose and 2 vinyl substituents], and so forth. In other words, these results demonstrate that the macromers are a mixture of different maleated APGs, containing the monomer and oligomers of glucose with up to three polymerizable vinyl substituents per macromer molecule.

Methods of Use.

The biobased macromers of the '199 patent are unexpectedly effective as bio-synthetic hybrid paper binder systems.

Example 1

Free-radical emulsion or suspension copolymerizations are conducted with vinyl monomers and APG maleic acid ester monomers. The emulsion polymerizations are carried out in 1 liter, 4 necked, round bottom reaction kettles equipped with overhead mechanical stirrer, a condenser, a monomer pre-emulsion feed inlet, a thermocouple, an initiator solution feed, a nitrogen purge feed, and a nitrogen bubbler. The reaction vessel is charged with distilled water, stirred at 200 rpm, heated by using a water bath controlled at 80±1° C., and purged with nitrogen. Sodium carbonate buffer and ammonium persulfate initiator are dissolved in water and charged to the reactor immediately before the monomer addition is started. Examples of typical polymerization recipes are known to one of skill in the art.

Monomer pre-emulsions or suspensions are prepared as follows. An APG maleic acid ester monomer composition, for which the preparation is given in subsequent Examples, is added to conventional styrene, butabiene, acrylate and/or vinylacetate monomers and mixed thoroughly. Pressurized polymerization kettles are employed when butadiene is used as a comonomer. The mixture is subsequently added slowly to a distilled water and surfactant solution, while stirring continuously, to form an oil in water emulsion. The monomer pre-emulsion feed is placed in a 500 mL, 3 necked, round bottom flask. Two of the openings are used for a nitrogen purge inlet and outlet and the third neck is fitted with a tube that draws the feed out by an LMI Milton Roy metering pump and into the polymerization vessel. The total monomer feed time is 2.5 hours. The monomer emulsion or suspension is continuously stirred using a magnetic stirbar throughout the feeding process and no phase separation is noticed. A distilled water and ammonium persulfate initiator solution is added continuously to the polymerization reactor for 3.5 hours using a Harvard Apparatus syringe pump. Just before addition of the monomer pre-emulsion is started, the nitrogen purge to the polymerization vessel is shut off, the outlet to the nitrogen bubbler is closed, and an 18 gauge needle is introduced in the rubber septum to maintain atmospheric pressure in the polymerization vessel during the addition of monomer pre-emulsion. This ensures that a nitrogen head is maintained and that the product does not crust on the wall of the reactor vessel. During the polymerization, 1 mL samples are taken for pH and % solids data as a function of time. The % solids are converted into % conversion data showing the overall conversion and confirming that starve-fed conditions are achieved. The appearance, color, scent, viscosity, stability, reflux, and bath and reactor temperatures are recorded throughout the polymerization reaction. The latex is heated for an additional 4.5 hours after all of the initiator had been added. At the end of the 8 hour polymerization period, the reaction mixture is cooled and filtered through a 100 mesh filter. Stable copolymer products are obtained with narrow particle size distributions within the range of 100 to 1000 nm. The usual variations of particle size with soap and monomer concentrations apply. Typical monomer conversions are 95 to 100%.

Example 2

A maleic acid ester of an APG is prepared as follows. To a 1 L erlenmeyer flask, containing a magnetic stir bar, 185.1 g anhydrous n-butanol (Aldrich, 99.8%), 36.1 g n-octanol (Aldrich, 99+%), and 2.0 g deionized water are added. To the stirred mixture, 0.184 g (100 mL) of concentrated sulfuric acid (J. T. Baker, 96.6%) is added using a 1 mL glass syringe. This mixture is added to a 500 mL three necked round bottom flask containing 50.0 g of anhydrous α-D-glucose (Aldrich, 96%) and a concave magnetic stir bar. The flask is fitted with a thermocouple probe, a dry air intake, and a 25 mL Barrett receiver on which two glass condensers are mounted, which are connected to a gas bubbler. The condensate collection side of the Barrett receiver is filled with n-heptane, and the gas flow-through side is wrapped in cotton wool for the purpose of insulation. Dry air, passed over a 10 inch column filled with dry molecular sieves and Drierite, is passed through the liquid phase in the round bottom flask. The flask is heated for 4 hours at about 95 to 100° C. using a temperature controlled oil bath. Approximately 12 mL of condensate water is collected in the Barrett receiver as a result of glucose oligomerization reaction and the aldol condensation reaction to give alkylation at the C1 position. The white suspension of sugar particles disappears as the reaction from glucose to APG proceeds until a clear solution is obtained. This demonstrates that the APG is soluble in the alcohol. The resulting APG solution is colorless, indicating that byproduct formation of colored bodies, such as furfurals, is minimized.

The APG solution is neutralized with 2.0 mL of a 7.30 g/100 mL solution of sodium hydroxide in deionized water. The excess butanol is removed by vacuum distillation at 70 to 105° C. and 22 to 25 inches of Hg. Analysis of the distillate by 500 MHz $^1$H nuclear magnetic resonance (NMR) spectroscopy shows that no detectable levels of octanol have distilled over. The degree of oligomerization, $DP_n$, of the APG is determined to be 1.65 by 500 MHz $^1$H NMR.

To a 100 mL addition funnel wrapped with heating tape, 71.35 g maleic anhydride (Sigma, 99+%) is added, a thermocouple is inserted, and the funnel is heated to 60 to 85° C. until all the maleic anhydride powder is melted. The liquid maleic anhydride is added over a period of about 10 minutes to the APG/octanol mixture which is at an initial temperature of about 100° C., resulting in an exotherm up to about 120° C. After 1 hour, the reaction is cooled to 500° C., and 162.8 g of n-hexanol (Aldrich, 98%) and about 50 g of dry molecular sieves are added for the esterification of free maleic acid groups. The esterification reaction is allowed to proceed for 12 hours at approximately 120° C. The reaction product is cooled and divided into two equal portions; to one of the portions 0.64 g of the titanium-based esterification catalyst "TYZOR" TBT Titanate (Du Pont Chemicals) is added; the mixture is reheated and allowed to react for an additional 12 hours. Excess hexanol is removed using a rotary evaporator. Samples taken for analysis by NMR and thin layer chromatography confirm the formation of APG, APG-maleic acid/octyl maleic acid mixture, and the APG-maleic/octyl maleic ester product in the respective reaction steps. 500 MHz $^1$H NMR analysis of the key fractions, which are eluted using silica gel (Aldrich, Grade 923, 100-200 mesh) column chromatography, further confirm the formation of the APG-maleic acid ester product. The pH of the APG-maleic acid/octyl maleic acid mixture is about 1.8, while the pH of the APG-maleic/octyl maleic ester product is about 6-7 for the two fractions prepared in the absence and in the presence of the esterification catalyst, respectively.

Example 3

The procedure given in Example 2 is followed. The reaction time to form the APG is 3 hours, 20 minutes. The $DP_n$ of the APG is determined to be 1.67. Instead of 71.35 g maleic anhydride, 75.90 g is used, and 200.0 g of anhydrous n-butanol is used in the esterification step in place of n-hexanol; 0.75 g of the "TYZOR" TBT catalyst is used, and 89 g of dry basic alumina in place of molecular sieves. Excess butanol is removed using a rotary evaporator. Samples are taken for analysis by NMR and thin layer chromatography, which confirms the formation of APG, APG-maleic acid/octyl maleic acid mixture, and their partial esterification products. The pH of the APG-maleic acid/octyl maleic acid mixture is about 1.8, while the pH of the final product is about 2.6.

Example 4

A maleic acid ester of an APG is prepared as follows. To a 1 L erlenmeyer flask, containing a magnetic stir bar, 411.4 g n-butanol (Mallinckrodt; 99.7%, 0.03% $H_2O$) is added, and to the stirred mixture, 0.368 g (200 mL) of concentrated sulfuric acid (J. T. Baker, 96.6%) is added using a 1 mL glass syringe. This mixture is added to a 1 L three necked round bottom flask containing 111.3 g of α-D-glucose (containing 8.8% water) and a concave magnetic stir bar. The flask is fitted with a thermocouple, a dry air intake, a Barrett receiver and two glass condensers as described in Example 2. The flask is heated for 3 hours, 25 minutes at about 95° to 102° C. Approximately 18 mL of condensate water is collected in the Barrett receiver. The white suspension of sugar particles disappears as the reaction from glucose to APG proceeds until a clear solution is obtained. The resulting APG solution is colorless. The APG solution is neutralized with 1.0 mL of a 29.2 g/100 mL solution of sodium hydroxide in deionized water. The $DP_n$ of the APG is determined to be 1.59 by 500 MHz $^1H$ NMR. Next 77.5 g of dibutyl maleate (Aldrich, 99.7%) is added to the APG-butanol solution. The excess butanol is removed by vacuum distillation at 75 to 105° C., and 26 to 29 inches of Hg. The APG is soluble in dibutyl maleate at temperatures above about 95° C. Analysis of the distillate by $^1H$ NMR shows that no detectable levels of dibutyl maleate have distilled over.

To a 250 mL addition funnel wrapped with heating tape, 110.24 g maleic anhydride (Sigma, 99+%) is added, a thermocouple is inserted, and the funnel is heated to 60 to 85° C. until all the maleic anhydride powder has melted. The liquid maleic anhydride is added over a period of about 13 minutes to the APG/dibutyl maleate mixture which is at the initial temperature of about 106° C., resulting in an exotherm up to about 120° C. The total reaction time is 4 hours. Samples are taken for analysis by NMR and thin layer chromatography, which confirm the formation of APG, and the complete conversion of APG to maleated APG in the respective reaction steps.

Example 5

The procedure given in Example 4 was followed using 411.6 g n-butanol (Aldrich, anhydrous, 99.8%), 2.0 g additional water, and 100.24 g anhydrous α-D-glucose. The APG reaction time is 3 hours, and the $DP_n$ of the APG is determined to be about 1.7. No dibutyl maleate is added prior to distillation of the alcohol. After removal of the excess butanol, the butyl glycoside thus produced is a viscous liquid. For the maleation reaction, 109.89 g maleic anhydride is used, which is added in less than 1 minute to facilitate stirring. The reaction temperature at the start of the reaction is 77° C., and an exotherm is observed up to about 117° C. The total reaction time is 4 hours. Samples are taken for analysis by NMR and thin layer chromatography, which confirm the formation of APG, and the complete conversion of APG to maleated APG in the respective reaction steps.

Example 6

The procedure given in Example 5 is followed using 411.8 g n-butanol (Aldrich, anhydrous, 99.8%), 2.0 g additional water, and 100.02 g anhydrous α-D-glucose. The APG reaction time is 3 hours, and the $DP_n$ of the APG is determined to be about 1.6. For the maleation reaction, 108.58 g maleic anhydride is used.

Example 7

The procedure given in Example 5 is followed using 411.4 g n-butanol (Aldrich, anhydrous, 99.8%), 2.0 g additional water, and 100.1 g anhydrous α-D-glucose. The APG reaction time is 3 hours. For the maleation reaction, 109.0 g maleic anhydride is used. The reaction time for the maleation is 2 hours. Following the maleation reaction, the intermediate product is divided into three portions to which 6, 23 and 76% of NEODOL R 23 (a C12-C13 mixture of alcohols, Shell Chemical Co., MWave=193) and 50 g of dry basic alumina are added for esterification at 120° C. for the 23 and 76% NEODOL fractions. The reaction time is about 4 hours for the 6% NEODOL fraction and about 15 hours for the other two fractions.

Example 8

The novel copolymers of the present invention are non-tacky under repulping conditions, they do not undergo redeposition onto paper fibers and they are broken down to particle sizes which are amenable to removal by the flotation process under typical shear conditions found in a paper recycling mill.

To illustrate the unique repulpability of the copolymers provided herein, the following test procedure is used. To 1 L of a caustic solution (NaOH, pH=10), 4 to 5 grams of a dry polymer film was added, and the mixture is blended at 65° C. for 5 minutes using a Waring Blender at the grate setting. Samples are taken from the foam and liquid phase, and examined under a phase contrast microscope at 100× times and at 1000× times magnifications. Examination of the foam shows that the foam is enriched in adhesive particles in the size range of 10 to 70 μm. This serves as a convenient method for examining the mass transfer of paper coating binder residue particles between the liquid and foam phases, a process well known to those skilled in the art of flotation deinking.

Photomicrographs are taken at both magnifications for various paper coating binder compositions provided in this invention, and their performance is compared with control paper coating binder compositions which contain no sugar-based vinyl monomer.

Photomicrographs (at 100× times magnification) of the liquid phase of a paper coating binder made with a sugar macromer of the present invention, show particles in the range of about 20 to about 200 μm in diameter. In the control experiment, a dry paper coating binder film is treated in the same manner, using a pressure sensitive adhesive of similar composition which does not contain a sugar-based monomer. In contrast, the dry paper coating binder film without the sugar-based monomer becomes sticky in the blender, and no-small particles are observed under the microscope at either 100× or 1000× magnification for this control sample. These results demonstrate that the adhesive which is copolymerized using the APG maleic acid ester monomer is more susceptible to break down to particles under the shear forces generated in the blender.

The sugar based paper binder copolymers of the present invention have the unique property of being broken up into small particles in a blender even in the absence of paper fiber.

Example 9

To better simulate the conditions found in a paper recycling mill, where such paper coating binders are present in coatings on paper, a model repulping experiment is conducted. This model experiment characterizes the fate of such paper coating binder residues in the presence of paper fiber. A variation of Example 8 is conducted to test the effects of shear conditions on model repulping experiments, in which such paper coating binder are present as coatings on for example Kraft paper or on LWC or fine paper.

The conditions of the experiment are as follows: 4.0 grams of wet paper coating binder (latex) is applied to a sheet of blotter paper (15 grams). This preparation is dried overnight and subsequently cut into 1.5 cm×1.5 cm squares. The paper squares are added to 500 mL of water, adjusted to pH=10 with NaOH, and blended in a Waring Blender for 5 minutes at 65° C. The resultant pulp slurry is examined under a phase contrast microscope at 100× magnification and at 1000× magnification. The paper coating binder particles are shown to range in size from about 3 up to about 30 μm. This represents a shift to lower particle size as compared to the particle size range in the repulping experiments where no Kraft fiber is present. This is due to the increase in effective shear forces generated in the blender when pulp fibers are present.

Paper coating binder particles can be observed to adhere to the edge of air bubbles for samples taken from the foam or aqueous layers. This demonstrates that the paper coating binder particles have the required hydrophobic/hydrophilic balance which is a basic requirement for physisorption of particles onto an air bubble, which is well known to those skilled in the art.

These prophetic examples demonstrate that paper coating binders containing the sugar based copolymers of the present invention are susceptible to breakdown by the shear forces generated in the blender, and that the size distribution of paper coating binder residues is in the range which is amenable to removal by flotation.

The products of the present invention provide new sugar-based copolymers utilizing agricultural resources which can be returned to those resources in an environmentally sound manner. The invention provides new polymeric materials for environmental compatibility. This is achieved by designing and engineering repulpable and biodegradable materials that are polymeric, yet break down under appropriate process conditions. Thus, the copolymers of the present invention facilitate the recycling of paper because they are sheared down into small particles in the paper recycling process. This allows the paper coating binder residues to be removed from the process water via the screening and flotation deinking facilities of a paper recycling mill. On the other hand, for disposable packaging applications, these sugar-based vinyl copolymers can be assimilated by microorganisms under composting conditions to help convert biodegradable waste into compost.

Conclusions.

The sugar macromer, which is essentially a mixture of multifunctional polymerizable macromers (see FIG. 5), provides a "soft" way to introduce a significant level (up to 25%) of a comonomer without the typical impact on glass transition temperature, Tg. By comparison, a difunctional crosslinker such as divinyl benzene quickly turns a soft, very low Tg rubber into a hard "bowling ball" with as little as 1-5% divinyl benzene comonomer. However, unlike divinyl benzene, this "soft" way of introducing multi-functionality and networking makes the sugar macromer particularly suitable for production of novel hybrid vinyl copolymer latexes.

Note that conventional S/B latex polymers used as binders in the paper industry commonly contain a substantial portion of crosslinked or networked emulsion particles, referred to as the "gel fraction". They also utilize functional monomers such as acrylic acid, methacrylic acid, and acrylonitrile. While high levels of the acid monomers tend to reduce gloss, acrylonitrile is generally preferred for performance reasons, although it is a relatively much more toxic substance that requires extensive steam stripping to remove unreacted monomer residues. These new sugar macromers therefore provide a new generation of renewable comonomers for bio-synthetic hybrid paper binder systems having a controlled hydrophilic-hydrophobic balance for improved offset printability, biodegradability, enhanced recyclability, and other performance attributes. The sugar macromers are copolymerized via a free radical copolymerization process (such as starve-fed emulsion polymerization) with vinyl comonomers to form various types of soft latexes, such as sugar-styrene-butadiene (Su/S/B), sugar-styrene-butyl acrylate (Su/S/BA), and sugar-polyvinyl acetate (Su/VAc) latexes. Based on comonomer composition, their dry glass transition temperatures (Tg's) are designed to range from −10 to 50° C., while their Tg's in the wet state range from −40 to 45° C. due to the hydroplasticizing effect of the sugar moieties. The incorporated sugar macromer polar moieties increase the surface energetics of Su/VAc, Su/S/B and Su/S/A latex copolymers, are therefore do not require to be copolymerized with either acrylonitrile (VCN) or acrylic acid (AA) or methacrylic acid (MA), along with various other functional monomers. Depending on the coated paper or paperboard product and application, the alkyl moieties attached to sugar macromers are selected to range from C4 to C30 to act as permanent in-situ plasticizers and for a controlled hydrophilic-hydrophobic balance for improved offset printability.

The sugar macromer technology represents a family of maleated alkyl polyglycosides produced from a biobased sugar (dextrose from corn) and a medium- to long-chain alcohol, wherein vinyl substituents facilitate copolymerization with conventional vinyl comonomers. The sugar macromers are GRAS and contain no VOCs. Given a significant amount (up to 25% or more) of sugar macromer can be incorporated into conventional synthetic latexes, this technology provides a path to a new generation of bio-synthetic hybrid paper binder systems. Some of the benefits include:

The sugar moieties can act as effective plasticizing segments (i.e., a hydroplasticizing effect) in the wet state, giving improved film formation and water retention and in turn higher Tg stiff segments in the dry state, in addition to a controlled hydrophilic-hydrophobic balance for improved offset printability, better recyclability, etc.

The alkyl moieties attached to sugar macromers which can range from C4 to C30 can be designed to act as permanent in-situ plasticizers.

The sugar macromers serve as a renewable replacement for acrylonitrile and other relatively toxic functional vinyl comonomers used in paper coating binders.

Other embodiments and uses of the invention will be apparent to those skilled in the art from consideration from the specification and practice of the invention disclosed herein. All references cited herein for any reason, including all journal citations and U.S./foreign patents and patent applications, are specifically and entirely incorporated herein by reference.

It is understood that the invention is not confined to the specific reagents, formulations, reaction conditions, etc., herein illustrated and described, but embraces such modified forms thereof as come within the scope of the following claims.

What is claimed is:

1. A method of preparing a paper coating comprising copolymerization of a vinyl-substituted alkyl polyglycoside with vinyl comonomers via a water based polymerization process to produce sugar based copolymers having a dry glass transition temperature (Tg) ranging from −10 to 50° C. and a Tg in the wet state ranging from −40 to 45° C. and forming a mixture comprising particles of the sugar based copolymers and a pigment in water.

2. A method according to claim 1, wherein the polymerization process is selected from the group consisting of a free radical starve-fed emulsion polymerization process and a free radical starve-fed suspension polymerization process.

3. A method according to claim 1, wherein the sugar based copolymers are copolymerized without acrylonitrile (VON), acrylic acid (AA) or methacrylic acid (MA).

4. A method according to claim 1, wherein up to 50% by weight of vinyl-substituted alkyl polyglycoside is copolymerized.

5. A method according to claim 1, wherein the alkyl moieties attached to the vinyl-substituted alkyl polyglycosides range from C4 to C30.

6. A method according to claim 1, wherein the copolymers are free of acrylonitrile.

7. A paper coating composition comprising particles produced by copolymerization of a vinyl-substituted alkyl polvqlycoside with vinyl comonomers via a water based polymerization process to produce sugar based copolymers having a dry glass transition temperature (Tg) ranging from −10 to 50° C. and a Tg in the wet state ranging from −40 to 45° C. and a pigment.

8. A paper coating composition according to claim 7, wherein the polymerization process is selected from the group comprising a free radical starve-fed emulsion polymerization process and a free radical starve-fed suspension polymerization process.

9. A paper coating composition according to claim 7 wherein the vinyl-substituted alkyl polyglycoside is not copolymerized with acrylonitrile (VCN), acrylic acid (AA) or methacrylic acid (MA).

10. A paper coating composition according to claim 7, wherein up to 50% by weight of vinyl-substituted alkyl polyglycoside is copolymerized.

11. A paper coating composition according to claim 7, wherein the alkyl moieties attached to the vinyl-substituted alkyl polyglycosides range from C4 to C30.

12. A paper coating composition according to claim 7 wherein the copolymers are free of acrylonitrile.

13. A paper coating composition according to claim 7, wherein the pigment is the major component.

14. A composition comprising a copolymerization product of a vinyl-substituted alkyl polyglycoside and a vinyl comonomer wherein the vinyl comonomer is selected from the group consisting of a) styrene, b) butyl acrylate c) styrene-butadiene, d) styrene-butyl acrylate, e) butadiene, and f) mixtures thereof; and a pigment.

15. The composition of claim 14 wherein the pigment is the major component of the composition.

16. The method of claim 1 wherein the vinyl comonomer is selected from the group consisting of a) styrene, b) butyl acrylate c) styrene-butadiene, d) styrene-butyl acrylate, e) butadiene, and f) mixtures thereof.

17. A paper coating composition according to claim 7 wherein the vinyl comonomer is selected from the group consisting of a) styrene, b) butyl acrylate c) styrene-butadiene, d) styrene-butyl acrylate, e) butadiene, and f) mixtures thereof.

* * * * *